United States Patent [19]
Duss et al.

[11] Patent Number: 5,574,350
[45] Date of Patent: Nov. 12, 1996

[54] MOTOR-OPERATED ADJUSTING DEVICE FOR MACHINES

[75] Inventors: Hanspeter Duss, Gretzenbach; Thomas Schweizer, Wikon, both of Switzerland

[73] Assignee: Grapha-Holding AG, Hergiswil, Switzerland

[21] Appl. No.: 328,818

[22] Filed: Oct. 25, 1994

[30] Foreign Application Priority Data

Nov. 8, 1993 [CH] Switzerland .............. 03345/93

[51] Int. Cl.$^6$ .............. G05B 19/35; H02P 5/00
[52] U.S. Cl. .............. 318/632; 318/573; 364/167.01
[58] Field of Search .............. 318/560–646; 364/474.01–474.34, 478, 167.01; 901/3; 307/149; 370/85.1

[56] References Cited

U.S. PATENT DOCUMENTS

| | | | |
|---|---|---|---|
| 4,373,405 | 2/1983 | Geil . | |
| 4,514,814 | 4/1985 | Evans | 364/474 |
| 4,621,200 | 11/1986 | Lovrenich | 307/149 |
| 4,705,960 | 11/1987 | Lovrenich | 307/149 |
| 4,764,883 | 8/1988 | Nakagawa et al. | 901/3 |
| 4,821,203 | 4/1989 | Carlton et al. | 364/478 |
| 4,825,133 | 4/1989 | Tanuma et al. | 318/113 |
| 4,831,582 | 5/1989 | Miller et al. | 364/900 |
| 4,897,834 | 1/1990 | Peterson et al. | 370/85.1 |
| 4,918,365 | 4/1990 | Tanuma et al. | 318/685 |
| 5,241,250 | 8/1993 | Nagasawa et al. | 318/591 |
| 5,391,970 | 2/1995 | Chaffee et al. | 318/618 |
| 5,394,323 | 2/1995 | Yellowley et al. | 318/573 |

FOREIGN PATENT DOCUMENTS

| | | |
|---|---|---|
| 0059570 | 9/1982 | European Pat. Off. . |
| 0275992 | 7/1988 | European Pat. Off. . |
| 0294918 | 12/1988 | European Pat. Off. . |
| 0320390 | 6/1989 | European Pat. Off. . |

*Primary Examiner*—Paul Ip
*Attorney, Agent, or Firm*—Spencer & Frank

[57] ABSTRACT

A motor-operated adjusting device is provided for adjusting machine axles. The device includes an addressable unit, an operating unit for executing control functions for adjusting a position of an axle to be adjusted, a bus coupling the operating unit to the addressable unit, and an adjusting unit. The adjusting unit includes a path indicator for indicating the position of the axle to be adjusted, a gear connected to the axle and a motor connected via the gear to the axle for adjusting the position of the axle, the motor and the output of the path indicator being connected via the addressable unit and the bus to the operating unit so that the operating unit can instruct the motor via the addressable unit to adjust the position of the axle in dependence of the position of the axle as indicated by the path indicator.

18 Claims, 2 Drawing Sheets

MOTOR-OPERATED ADJUSTING DEVICE FOR MACHINES

CROSS REFERENCE TO RELATED APPLICATION

This application claims the priority of Swiss Application Serial No. CH 03345/93-0 filed in Switzerland on Nov. 8, 1993, the subject matter of which is incorporated herein by reference.

BACKGROUND OF THE INVENTION

The present invention relates to a motor-operated adjusting device for machine axles.

Generally, machine setup times are becoming ever more important for a cost-effective use of machines. This is true, on the one hand, because of the demands in terms of net machine output and, on the other, because the accessibility of machine parts is increasingly obstructed owing to safety devices. These circumstances are, in particular, of decisive importance for machines in the graphics processing industry.Various motor-operated adjustments are known. These have always been designed for specific applications and, therefore, are usually not suited for general use. Adjusting functions can, for instance, be carried out by customary machine parts. This, however, leads to large and expensive solutions that are only appropriate in individual cases. For wide and modular applications, a great number of requirements must be met, such as:

a) reasonable price, because in most cases several to very many axles must be actuated;

b) in exchange, only a limited service life because the adjustment is used much less than the processing machine itself;

c) small space requirement;

d) possibility of compact wiring, since installations must also take place at movable elements in processing machines and the accessibility and maintainability of the machine must not be obstructed;

e) simple overload protection because objects may be located along the travel path:

f) position indicator, advantageously absolute;

g) possibility of manual override for emergency operation or for operators working with conventional methods;

h) very different adjustment ranges in the same system (very small to large travel paths and loads);

i) no drifting away during operation, e.g., because of vibrations;

k) in any event, the desire to be able to store and retrieve special basic or standard settings.

SUMMARY OF THE INVENTION

Therefore, it is an object of the present invention to create a motor-operated adjusting device that is adapted to processing machines, with the device meeting at least some of the above-mentioned requirements in a single product line.

This object and others are achieved by the motor-operated adjusting device for machine axles according to the invention, where in an adjusting unit a motor is directly connected via a corresponding gear to the axle that is to be adjusted and to a path indicator and that both the motor power supply as well as the signals of the path indicator are connected via an addressable unit by means of a bus to an operating unit executing control functions.

Thus it is accomplished to provide mechanical components, in a universal manner, with electronic properties which they do not inherently have or which they only have at great expenditure.

Advantageous embodiments of the adjusting device according to the invention are explained in below on the basis of the accompanying drawings.

DETAILED DESCRIPTION OF THE PREFERRED EMBODIMENT

Figure 1:
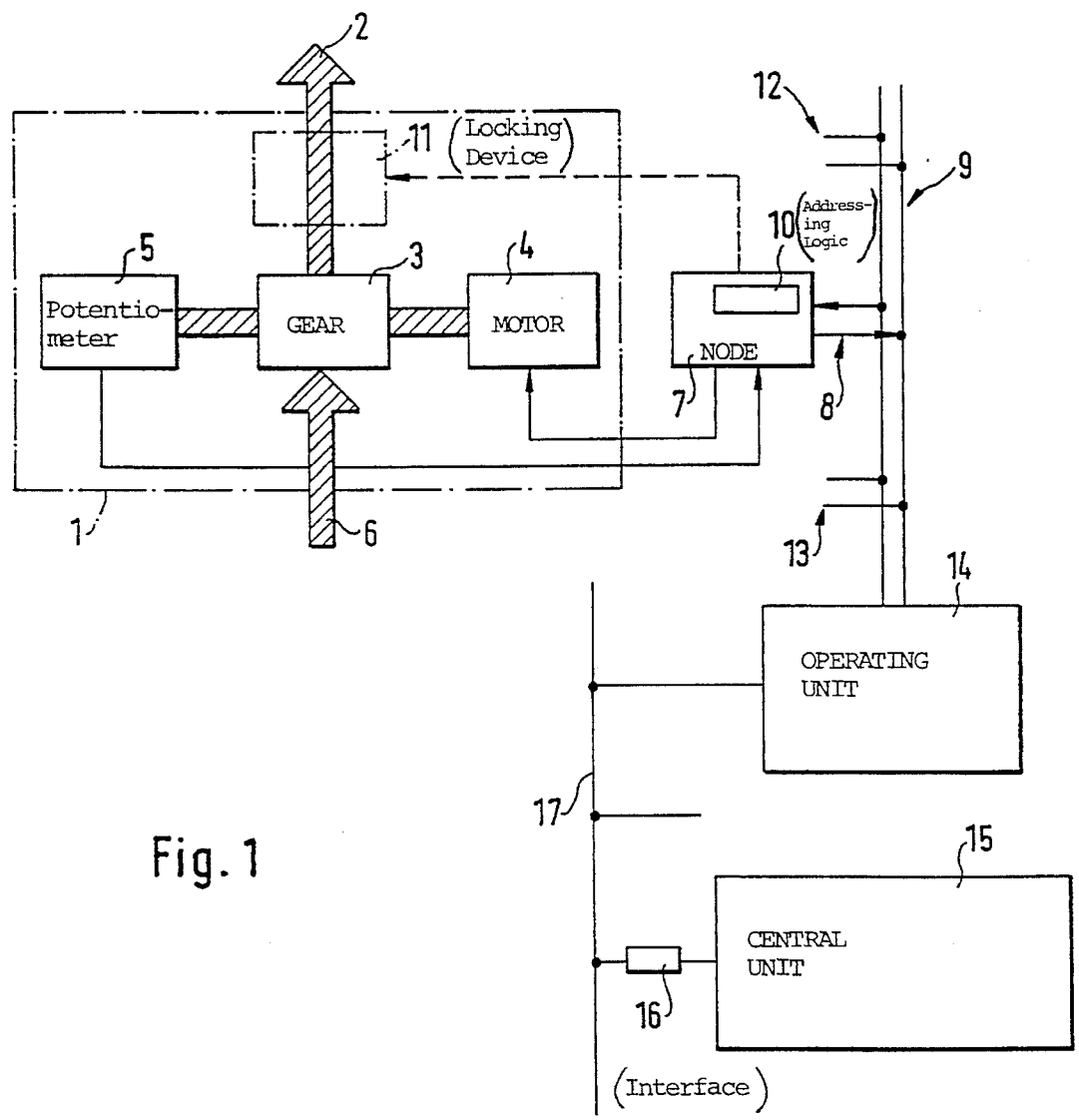
FIG. 1. a fundamental diagram of a motor-operated adjusting unit and its connections with a machine-dependent operating unit via an addressable unit and a bus according to the present invention.

FIG. 1 shows a motor-operated adjusting unit 1 for an axle 2 that is to be adjusted. A feeder of an insetting, a back gage stitching or a bookbinding machine is used as an example of a machine, for which at least one axle, but usually a plurality of axles, is to be adjusted. As is known, in the processing of printed sheets a plurality of such feeders accomplishes the separation of stacked printed sheets for the production of unbound books, usually by means of rotating gripper drums provided in the feeders.

In the feeder, especially the following distances or elements related to the respective printed sheets must be adjusted before processing is started:

length of the sheet width of the sheet sheet stop sheet brake pressure rollers and separating needles of the lateral stops.

Axle 2, schematically shown in FIG. 1, thus relates to the axle of an adjusting device for changing one of the above-mentioned feeder parameters. Thus, there is a plurality of adjusting units 1 provided in the feeder so that the mentioned settings can be executed.

FIG. 1 also shows that the axle 2 to be adjusted is driven by a motor 4 via a gear 3. The motor 4 can be an a-c or d-c motor. Since the output needed to rotate the axle 2 is usually small, a correspondingly small electric motor suffices. Instead of such a motor, electromagnets, electropneumatic valves, and the like, may also be provided to move the axle 2.

Also connected to a shaft of the gear 3 is the axle of a potentiometer 5, which is preferably configured as a 10 speed potentiometer. A manual adjusting device 6 also acts on the gear 3 and thus on the axle 2 and the potentiometer 5.

An input in the motor 4, and an output of the potentiometer 5 are connected to an addressable unit 7 which, on the one hand, drives the motor 4 and to which, on the other, a signal is fed that corresponds to the respective position of the potentiometer 5 and thus to the position of the axle 2. The unit 7 is connected to a bus 9 via a plurality of lines 8 which are explained in the following in greater detail. A bus is defined, in the known manner, as a connection transmitting information between selectively addressable electric rodes (units). Correspondingly, the unit 7 contains an addressing logic 10.

In case that the automatic lock of the gear 3 and of the axle 2 connected to it does not reliably exclude unintentional adjustments due to vibrations etc. during operation, an indicated locking device 11, which is controlled by the unit 7, can be provided for the axle 2.

As has already been mentioned, each axle 2 of the machine that is to be adjusted, in the present case of the feeder, is assigned an adjusting unit 1 according to FIG. 1. Naturally, the respective units 7 are provided with different addresses and are connected to the bus 9 via the lines 12 and 13 that are indicated in the drawing. Further details regarding the configuration of the unit 7 appear in the following based on FIG. 2.

The bus 9 is connected to an operating unit 14 which is installed on the machine or the feeder. The operating unit 14 is provided with operating elements, e.g. keys, also with a display unit, storage means and a bus master. Further details follow based on FIG. 3

FIG. 1 also shows that the present embodiment is provided with a central unit 15 which is connected, via an interface 16 as well as lines 17, to the operating unit 14 and additional operating units that are not shown, which are respectively associated with other machines or feeders. The central unit 15 allows for the central control of all existing machines or feeders.

Figure 2:
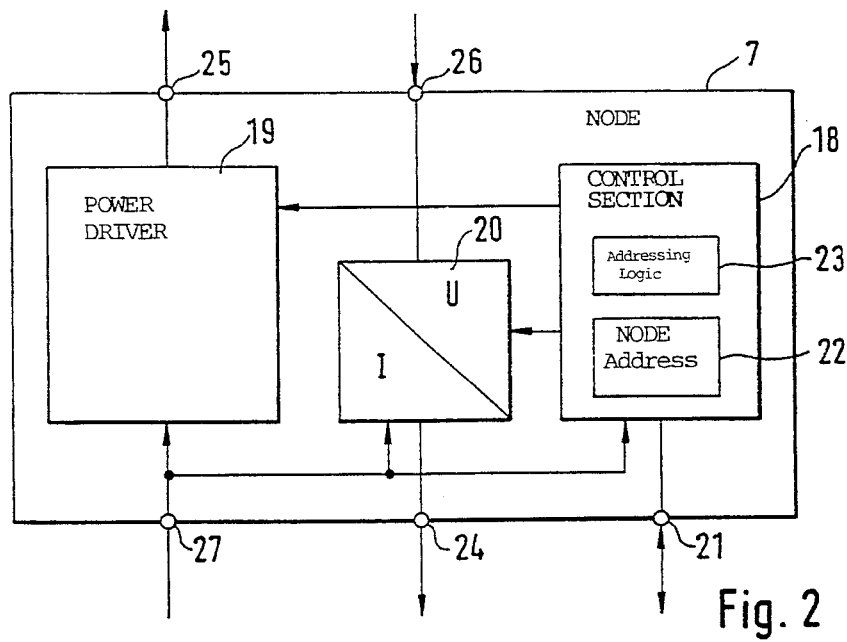
FIG. 2. a block diagram of the addressable unit of FIG. 1.

According to the block diagram of FIG. 2, the unit 7 is provided with a control section 18, a power driver 19 and a voltage/current transformer 20. The unit 7 has a digital bus connection 21, which is connected to the control section 18 to receive and put out digital signals. The control section 18 contains an addressing logic 22 and a unit address 23. The unit 7 is also provided with an analog bus connection 24 which is connected to the output of the voltage/current transformer 20. The control section 18 puts out control signals to the power driver 19 and to the voltage/current transformer 20. The power driver 19 is connected to a service connection 25 to which the motor 4 of FIG. 1 is connected. The input of the voltage/current transformer 20 is connected to a measuring connection 26 to which the potentiometer 5 of FIG. 1 is connected.

The power supply of the control section 18, the power driver 19 and the voltage/current transformer 20 takes place via a feed connection 27. Both the digital bus connection 21 and the analog bus connection 24 as well as the feed connection are connected via the lines 8 with one wire each or with a plurality of wires of the bus 9, as is indicated in FIG. 1.

Figure 3:
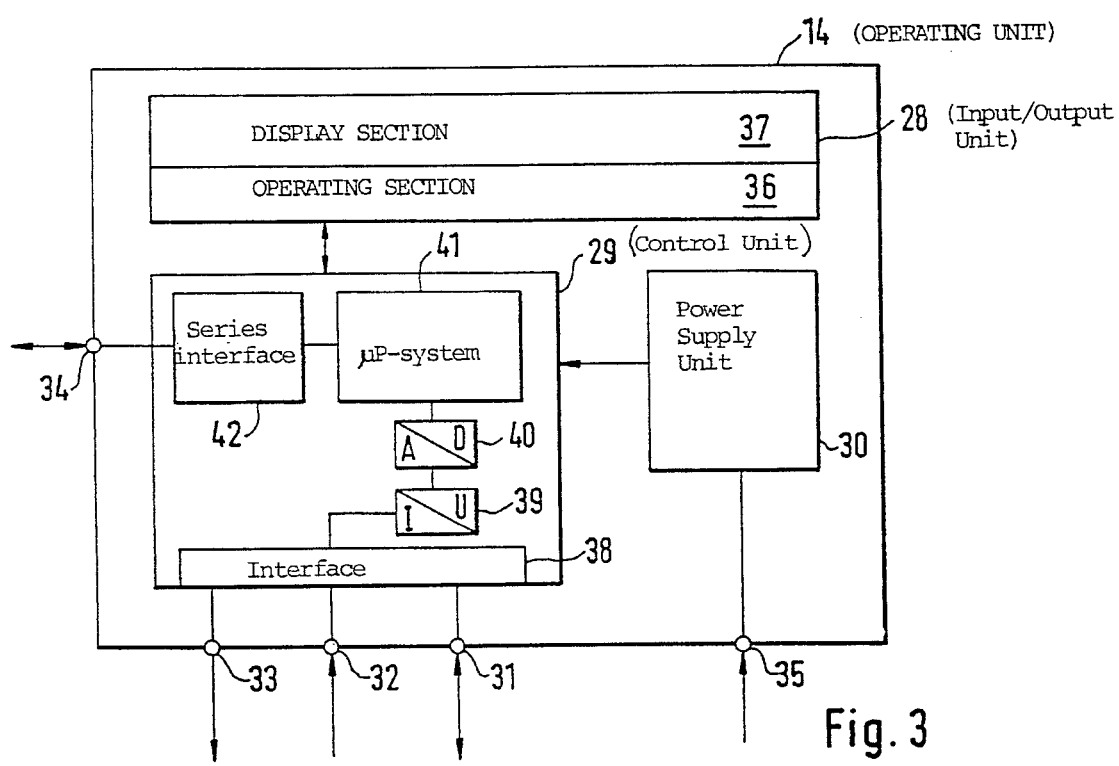
FIG. 3. a block diagram of the machine-dependent operating unit of FIG. 1.

The block diagram of FIG. 3 shows that the operating unit 14 contains an input and output unit 28, a control unit 29 and a power supply unit 30. The operating unit 14 is connected, via a digital bus connection 31, an analog bus connection 32 and a feed connection 33 to the bus 8 of FIG. 1 and thus to all units 7 of the respective machine or the respective feeder. An additional connection 34 is connected to the central unit 15 in FIG. 1.

Finally, a further feed connection 35 is provided to which the power supply unit 30 is connected within the operating unit 14 and which is supplied with the necessary supply energy, e. g., d. c. supply with a voltage of 24 volt, by an external power source which is not shown.

The input-output unit 28 consists of an operating section 36 and a display section 37. The respective axle 2 (FIG. 1) to be adjusted can be selected and set at the operating section 36, e.g., by means of pushbuttons, a process during which the corresponding control signals, provided with the desired address, are put out to the bus 8 of FIG. 1 via the digital bus connection 31 and thus actuate the selected axle 2. The position of the axle 2 which is thus changing or the momentary setting of the respective machine section can be read from the display section, e.g., a liquid-crystal plate. This position information travels from the potentiometer 5 of the adjusting unit 1 to the analog bus connection 32. The bus connections 31, 32 and 33 are connected to an interface 38 of the bus master in the control unit 29. The control unit 29 also contains a current/voltage transformer 39, an analog-digital converter 40, a μP-system 41 with nonvolatile storage and a series interface 42 for the connection 34 to the central unit 15.

Advantageously, the input-output unit 28 is configured and arranged on the machine in such a way that it can be operated and viewed from two sides of the machine, especially from the front and from the rear. The display section 37 may comprise several display lines so that several settings are visible simultaneously.

The manual adjusting device 6 of FIG. 1 allows fine adjustments or a manual emergency operation. The corresponding measurement signal reaches the operating unit 14 via the potentiometer 5 which is simultaneously actuated and there becomes visible in the display section 37 of the operating unit. Here, it is advantageous for the operating unit 14 to be configured such that if one of the axles 2 is adjusted manually, the display in the operating unit 14 is automatically switched over to the respective axle.

Furthermore, each unit 7 (FIG. 1) can be provided with a current measurement device which transmits an overcurrent to the operating unit 14 via the bus 9 by means of a corresponding signal; the operating unit then switches off the respective motor. Such an overcurrent may occur when the adjusting movement is obstructed, e.g., by a product, an auxiliary stop or an object which is inadvertently in the way.

Another safety measure may consist in the operating unit 14 being provided with switching means to monitor the analog signals of the potentiometer 5 and to correct them if deviations are detected.

The adjusting device described has three different operating modes:

Necessary adjustments may be made manually in a known manner while, however, offering the advantage that the respective adjustments can be viewed immediately.

Furthermore, the necessary adjustments may be made at the operating unit 14 by actuating keys and they may also be read off there.

Finally, the settings made for a specific product may be stored in the operating unit 14 and retrieved at any later time and may be activated automatically for the purpose of corresponding adjustments.

The operating unit 14 thus executes a number of control functions, i. e., travel path limitation, overload shutdown, detection of set point deviations, direction of rotation, etc. Adjustment range, scale and unit of measurement, e.g., in mm for the travel path, p for the contact pressure of a spring etc., may be determined and stored for each axle in the operating unit 14.

For all adjustment processes, the operating unit 14 may be configured such that by addressing the corresponding unit 7, different axles can be adjusted consecutively or simultaneously.

As described on the basis of FIG. 1, the central unit 15 is connected to one or a plurality of operating units 14 via an interface (e.g., RS 485) so as to be able to actuate a central adjustment of a plurality or of all physically separate machines or feeders. Here, the central unit 15 may be provided with all or only a portion of the operating and display elements of the individual operating units 14, depending on the requirements. Vice versa, only some of the operating and display elements described may be contained in the operating units, if the central unit 15 is to function in master/slave mode with the operating units 14. The central unit 15 may consist of a personal computer, a store-programmable control or an already existing machine control system that is to be expanded.

The following means are available to allow for an analog or digital as well as a serial or parallel signal transmission via the bus 9 (FIG. 1):

digital signal transmission via analog-digital converter;

analog signal transmission with voltage/current sources to the unit 7, e. g., with a voltage-controlled power source according to FIG. 2;

serial transmission with one to two lines (bidirectional/ unidirectional input and output);

parallel transmission via a plurality of parallel lines, e.g., with control lines, to indicate the importance of the various lines, with n address lines for $2^n$ addresses, with digital and/or analog data lines and with possible ground wires.

For this purpose, the bus may be given additional feed lines.

In order to expand the present adjusting device, the bus 9 may be spliceable in a simple manner to accomplish a tree structure. As a means to achieve this purpose, impedance matching at the end of the bus is dispensed with and the voltage increase at the bus driver output to, e. g, less than 10 V/µs to avoid reflections is limited.

It will be understood that the above description of the present invention is susceptible to various modifications, changes and adaptations, and the same are intended to be comprehended within the meaning and range of equivalents of the appended claims.

What is claimed is:

1. A motor-operated adjusting device for adjusting machine axles, comprising:

an addressable unit;

an operating unit for executing control functions for adjusting a position of an axle to be adjusted;

a bus coupling the operating unit to said addressable unit; and an adjusting unit including:

a path indicator for indicating the position of the axle to be adjusted, a gear connected to the axle and to the path indicator, and a motor having an output directly connected via the gear to both the axle and the path indicator for adjusting the position of the axle, an output of the motor and an output of the path indicator being directly connected, via the addressable unit and the bus, to the operating unit so that the operating unit can instruct the motor via the addressable unit to adjust the position of the axle in dependence of the position of the axle as indicated by the path indicator.

2. The adjusting device according to claim 1, wherein the path indicator comprises a potentiometer.

3. The adjusting device according to claim 1, wherein the operating unit includes means for determining and storing a range, a scale and a unit of measurement for each axle.

4. The adjusting device according to claim 1, wherein the bus is configured for serial or parallel transmission of digital and/or analog signals.

5. The adjusting device according to claim 1, wherein the bus is spliceable and expandable by dispensing with impedance matching and by limiting the temporal voltage change at the output of a bus driver.

6. The adjusting device according to claim 1, wherein the adjusting unit includes an adjusting device that can be operated manually.

7. The adjusting device according to claim 1, wherein the adjusting unit includes a locking device that is controllable via the unit for locking the position of the axle.

8. The adjusting device according to claim 1, wherein the motor is an electric motor.

9. The adjusting device according to claim 1, wherein the operating unit includes an operating section for selecting an axle and setting an adjustment for the selected axle, and a display section to display one or simultaneously a plurality of settings actuated by the adjusting unit.

10. The adjusting device according to claim 9, wherein the operating unit is configured to automatically determine when an axle is adjusted manually by periodically polling a reference variable of the path indicator and comparing the reference variable with a set point, and the display section of the operating unit is configured to automatically switch over to a display of an actual value of the axle.

11. The adjusting device according to claim 1, wherein the operating unit is configured to determine an obstruction of the motor by registering a motor current and to automatically shut down the motor if a preselected value is exceeded.

12. The adjusting device according to claim 10, wherein the operating unit is configured to automatically determine, by periodically polling the reference variable of the path indicator and comparing it with the set point, when an axle position is slowly adjusting itself and to correct the position of the axle back to the set point.

13. The adjusting device according to claim 1, wherein the operating unit is configured so that it can be operated from more than one side.

14. The adjusting device according to claim 1, further comprising a central unit coupled to said operating unit for actuating a central adjustment for a plurality of axles.

15. The adjusting device according to claim 14, wherein the operating unit is configured to work either in a master/ slave mode with the central unit or autonomously.

16. The adjusting device according to claim 14, wherein the operating unit and/or the central unit is configured for the storage, administration and initialization of predetermined settings.

17. The adjusting device according to claim 14, the operating unit and/or the central unit is configured for a consecutive adjustment of a plurality of axles.

18. The adjusting device according to claim 14, the operating unit and/or the central unit is configured for the simultaneous adjustment of a plurality of axles.

* * * * *